US011869523B2

(12) United States Patent
Kordon et al.

(10) Patent No.: US 11,869,523 B2
(45) Date of Patent: Jan. 9, 2024

(54) METHOD AND APPARATUS FOR DECODING A BITSTREAM INCLUDING ENCODED HIGHER ORDER AMBISONICS REPRESENTATIONS

(71) Applicant: Dolby Laboratories Licensing Corporation, San Francisco, CA (US)

(72) Inventors: Sven Kordon, Wunstorf (DE); Alexander Krueger, Burgdorf (DE); Oliver Wuebbolt, Hannover (DE)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 17/970,118

(22) Filed: Oct. 20, 2022

(65) Prior Publication Data

US 2023/0108008 A1 Apr. 6, 2023

Related U.S. Application Data

(60) Continuation of application No. 17/558,550, filed on Dec. 21, 2021, now Pat. No. 11,488,614, which is a (Continued)

(30) Foreign Application Priority Data

Jan. 8, 2014 (EP) .................................... 14305022
Jan. 16, 2014 (EP) .................................... 14305061

(51) Int. Cl.
*H04R 5/00* (2006.01)
*G10L 19/20* (2013.01)
(Continued)

(52) U.S. Cl.
CPC ............ *G10L 19/20* (2013.01); *G10L 19/008* (2013.01); *H04S 3/008* (2013.01); *H04S 2420/11* (2013.01)

(58) Field of Classification Search
None
See application file for complete search history.

(56) References Cited

U.S. PATENT DOCUMENTS 7,394,903 B2 * 7/2008 Herre .................... G10L 19/008 381/23
2005/0157883 A1 7/2005 Herre et al.
(Continued)

FOREIGN PATENT DOCUMENTS

CN 101375614 B 2/2009
CN 102823277 12/2012
(Continued)

OTHER PUBLICATIONS

Ben, D. et al. "RM1-HOA Working Draft Text 1 & 2" Qualcomm, Technicolor, Orange, ISO/IEC JTC1/SC29/WG11 MPEG 2014/M31827, Jan. 2014, San Jose, USA.
(Continued)

*Primary Examiner* — Duc Nguyen
*Assistant Examiner* — Assad Mohammed

(57) ABSTRACT

Higher Order Ambisonics represents three-dimensional sound independent of a specific loudspeaker set-up. However, transmission of an HOA representation results in a very high bit rate. Therefore compression with a fixed number of channels is used, in which directional and ambient signal components are processed differently. For coding, portions of the original HOA representation are predicted from the directional signal components. This prediction provides side information which is required for a corresponding decoding. By using some additional specific purpose bits, a known side information coding processing is improved in that the required number of bits for coding that side information is reduced on average.

4 Claims, 7 Drawing Sheets

Related U.S. Application Data continuation of application No. 16/925,334, filed on Jul. 10, 2020, now Pat. No. 11,211,078, which is a division of application No. 16/719,806, filed on Dec. 18, 2019, now Pat. No. 10,714,112, which is a division of application No. 16/532,302, filed on Aug. 5, 2019, now Pat. No. 10,553,233, which is a division of application No. 16/189,797, filed on Nov. 13, 2018, now Pat. No. 10,424,312, which is a division of application No. 15/956,295, filed on Apr. 18, 2018, now Pat. No. 10,147,437, which is a division of application No. 15/110,354, filed as application No. PCT/EP2014/078641 on Dec. 19, 2014, now Pat. No. 9,990,934.

(51) Int. Cl.
*G10L 19/008* (2013.01)
*H04S 3/00* (2006.01)

(56) References Cited

U.S. PATENT DOCUMENTS

| | | | | |
|---|---|---|---|---|
| 2007/0127733 | A1* | 6/2007 | Henn | G10L 19/008 381/80 |
| 2007/0269063 | A1* | 11/2007 | Goodwin | G10L 19/008 381/310 |
| 2008/0002842 | A1* | 1/2008 | Neusinger | G10L 19/26 381/119 |
| 2009/0248425 | A1* | 10/2009 | Vetterli | G10L 19/0204 704/503 |
| 2012/0155653 | A1* | 6/2012 | Jax | H04H 20/89 381/23 |
| 2013/0216070 | A1 | 8/2013 | Keiler et al. | |
| 2015/0304766 | A1* | 10/2015 | Delikaris-Manias | H04R 1/32 381/92 |

FOREIGN PATENT DOCUMENTS

| | | | | |
|---|---|---|---|---|
| CN | 103313182 | | 9/2013 | |
| EP | 2451196 | | 5/2012 | |
| EP | 2637428 | | 9/2013 | |
| EP | 2665208 | A1 | 11/2013 | |
| JP | 2015537256 | | 12/2015 | |
| WO | 2012059385 | | 5/2012 | |
| WO | WO-2012059385 | A1 * | 5/2012 | G10L 19/00 |
| WO | 2013000740 | | 1/2013 | |
| WO | 2013171083 | A1 | 11/2013 | |

OTHER PUBLICATIONS

Boehm, J. et al "RMO-HOA Working Draft Text" MPEG Meeting/ M31408, ISO/IEC JTC1/SC29/WG11, Oct. 23, 2013, Geneva, Switzerland.

Gong Huizhe "The Improvement for Ambisonic System Optimization" a Dissertation submitted for the Degree of Doctor of Philosophy, Oct. 15, 2011.

Nicol, Rozenn "Sound Spatialization by Higher Order Ambisonics: Encoding and Decoding a Sound Scene in Practice from a Theoretical Point of View . . . " Proc. of the 2nd International Symposium on Ambisonics and Spherical Acoustics, May 6-7, 2010, Paris, France, pp. 1-9.

Sen, D. et al. "RM1-HOA Working Draft Text 1 & 2" Qualcomm, Technicolor, Orange, ISO/IEC JTC1/SC29/WG11 MPEG 2014/ M31827, Jan. 2014, San Jose, USA.

Wikipedia, free encyclopedia "Sparse Array" Jul. 6, 2012.

Zhuang, L. et al "Ambisonic encoding and Decoding with Spatial Window" Ambisonic Technical Acoustics Dec. 2013, vol. 32, No. 6.

* cited by examiner

```
{Fill ActivePred (bit array of length O)}

NumActivePred = 0
for q = 1 to O do
  if p_TYPE,q = 0  then
    ActivePred [q] = 0
  else
    ActivePred [q] = 1
    NumActivePred ← NumActivePred + 1

  end if
end for

{Fill PredType (bit array of length NumActivePred) }
{and PredDirSigIds (unsigned integer array of length NumActivePred · D_PRED)}

j = 1
i = 1
NumNonZeroIds = 0
for q = 1 to O do
  if ActivePred [q] = 1  then
    PredType [j] = p_TYPE,q − 1
    j ← j + 1

    if  p_IND,d,q ≠ 0 then
      NumNonZeroIds ← NumNonZeroIds + 1
    end if

    for  d = 1 to D_PRED do
      PredDirSigIds [i] = p_IND,d,q
      i ← i + 1
    end for
  end if
end for

{Fill QuantPredGains (integer array of length NumNonZeroIds)}

i = 1
for q = 1 to O do
  for  d = 1 to D_PRED do
    if  p_IND,d,q ≠ 0 then
      QuantPredGains [i] = p_Q,F,d,q
      i ← i + 1
    end if
  end for
end for
```

Fig. 5

```
{Set bit PSPredictionActive }
PSPredictionActive = 0
for q = 1 to O do
  if p_TYPE,q > 0 then
    PSPredictionActive = 1
  end if
end for

if PSPredictionActive = 1 then
  {Set bit KindOfCodedPredIds }
  NumActivePred = 0
  for q = 1 to O do
    if p_TYPE,q > 0 then
      NumActivePred ← NumActivePred + 1
    end if
  end for

  if NumActivePred < M_M then
    KindOfCodedPredIds = 1
  else
    KindOfCodedPredIds = 0
  end if

  if KindOfCodedPredIds = 0 then
    {Fill ActivePred (bit array of length O)}
    for q = 1 to O do
      if p_TYPE,q = 0 then
        ActivePred [q] = 0
      else
        ActivePred [q] = 1
      end if
    end for
  else
    {Fill PredIds (array of length NumActivePred)}
    j = 1
    for q = 1 to O do
      if p_TYPE,q > 0 then
        PredIds [j] = q
        j ← j + 1
      end if
    end for
  end if

  {Fill PredType (bit array of length NumActivePred) }
  {and PredDirSigIds (unsigned integer array of length NumActivePred · D_PRED)}
  {Same as in the state of the art coding algorithm Alg. 1, except for one change, i.e.}
  {replace PredDirSigIds [i] = p_IND,d,q by}
    if p_IND,d,q = 0 then
      PredDirSigIds [i] = 0
    else
      PredDirSigIds [i] = α such that ĩ_ACT,α = p_IND,d,q
    end if

  {Fill QuantPredGains (integer array of length NumNonZeroIds)}
  {Same as in the state of the art coding algorithm Alg. 1 }
end if
```

Fig. 6

```
{Init p_TYPE (vector with O elements), P_IND and P_Q,F (matrices with D_PRED rows and O columns) }
  for q = 1 to O do
    p_TYPE,q = 0
    for d = 1 to D_PRED do
        p_IND,d,q = 0
        p_Q,F,d,q = 0
    end for
  end for
Read bit PSPredictionActive
if PSPredictionActive = 1 then
  Read bit KindOfCodedPredIds
  if KindOfCodedPredIds = 0 then
    Read ActivePred (bit array of length O)
    {Compute number of active predictions}
      NumActivePred = 0
      for q = 1 to O do
        if ActivePred[q] = 1 then
            NumActivePred ← NumActivePred + 1
        end if
      end for
    Read PredType (bit array of length NumActivePred)
    {Set elements of p_TYPE }
      i = 1
      for q = 1 to O do
        if ActivePred[q] = 1 then
            if PredType[i] = 0 then
                p_TYPE,q = 1
            else
                p_TYPE,q = 2
            end if
            i ← i + 1
        end if
      end for
  else
    Read NumActivePred (coded by ⌈log2(M_M)⌉ bits, M_M is greatest integer satisfying equation(25) )
    Read PredIds ( array with NumActivePred elements, each coded by ⌈log2(O)⌉ bits)
    Read PredType (bit array of length NumActivePred)
    {Set elements of p_TYPE }
      for i = 1 to NumActivePred do
        if PredType[i] = 0 then
            p_TYPE,PredIds[i] = 1
        else
            p_TYPE,PredIds[i] = 2
        end if
      end for
  end if
  {Decode matrices P_IND and P_Q,F according to Alg. 4 }
end if
```

Fig. 7

```
Read PredDirSigIds
  (array with NumActivePred · D_PRED elements, each coded by ⌈log2(D̃_ACT+1)⌉ bits)
{Set elements of P_IND (matrix with D_PRED rows and O columns) }
  i = 1
  NumNonZeroIds = 0
  for q = 1 to O do
    for d = 1 to D_PRED do
      if p_TYPE,i > 0 then
        if PredDirSigIds[i] > 0 then
          p_IND,d,q = ĩ_ACT,PredDirSigIds[i]
          NumNonZeroIds ← NumNonZeroIds + 1
        end if
        i ← i + 1
      end if
    end for
  end for
Read QuantPredGains (array with NumNonZeroIds elements, each coded by B_SC bits)
{Set elements of P_Q,F (matrix with D_PRED rows and O columns) }
  i = 1
  for q = 1 to O do
    for d = 1 to D_PRED do
      if p_IND,d,q > 0 then
        p_Q,F,d,q = QuantPredGains[i]
        i ← i + 1
      end if
    end for
  end for
```

Fig. 8

METHOD AND APPARATUS FOR DECODING A BITSTREAM INCLUDING ENCODED HIGHER ORDER AMBISONICS REPRESENTATIONS

CROSS REFERENCE TO RELATED APPLICATIONS

This application is a continuation of U.S. patent application Ser. No. 17/558,550, filed Dec. 21, 2021, which is a continuation of U.S. patent application Ser. No. 16/925,334 filed Jul. 10, 2020, now U.S. Pat. No. 11,211,078, which is a divisional of U.S. patent application Ser. No. 16/719,806, filed Dec. 18, 2019, now U.S. Pat. No. 10,714,112 which is a divisional of U.S. patent application Ser. No. 16/532,302, filed Aug. 5, 2019, now U.S. Pat. No. 10,553,233, which is a divisional of U.S. patent application Ser. No. 16/189,797, filed Nov. 13, 2018, now U.S. Pat. No. 10,424,312, which is a divisional of U.S. patent application Ser. No. 15/956,295, filed Apr. 18, 2018, now U.S. Pat. No. 10,147,437, which is a divisional of U.S. patent application Ser. No. 15/110,354, filed Jul. 7, 2016, now U.S. Pat. No. 9,990,934, which is U.S. national stage of International Application No. PCT/EP2014/078641, filed Dec. 19, 2014, which claims priority to European Patent Application Nos. 14305061.5 and 14305022.7, filed Jan. 16, 2014 and Jan. 8, 2014, respectively, each of which is hereby incorporated by reference in its entirety.

TECHNICAL FIELD

The invention relates to a method and to an apparatus for improving the coding of side information required for coding a Higher Order Ambisonics representation of a sound field.

BACKGROUND

Higher Order Ambisonics (HOA) offers one possibility to represent three-dimensional sound among other techniques like wave field synthesis (WFS) or channel based approaches like the 22.2 multichannel audio format. In contrast to channel based methods, the HOA representation offers the advantage of being independent of a specific loudspeaker set-up. This flexibility, however, is at the expense of a decoding process which is required for the playback of the HOA representation on a particular loudspeaker set-up. Compared to the WFS approach, where the number of required loudspeakers is usually very large, HOA signals may also be rendered to set-ups consisting of only few loudspeakers. A further advantage of HOA is that the same representation can also be employed without any modification for binaural rendering to head-phones.

HOA is based on the representation of the spatial density of complex harmonic plane wave amplitudes by a truncated Spherical Harmonics (SH) expansion. Each expansion coefficient is a function of angular frequency, which can be equivalently represented by a time domain function. Hence, without loss of generality, the complete HOA sound field representation actually can be assumed to consist of O time domain functions, where O denotes the number of expansion coefficients. These time domain functions will be equivalently referred to as HOA coefficient sequences or as HOA channels in the following.

The spatial resolution of the HOA representation improves with a growing maximum order N of the expansion. Unfortunately, the number of expansion coefficients O grows quadratically with the order N, in particular $O=(N+1)^2$. For example, typical HOA representations using order N=4 require O=25 HOA (expansion) coefficients. According to the previously made considerations, the total bit rate for the transmission of HOA representation, given a desired single-channel sampling rate $f_s$ and the number of bits $N_b$ per sample, is determined by $O \cdot f_s \cdot N_b$. Consequently, transmitting an HOA representation of order N=4 with a sampling rate of $f_s$=48 kHz employing $N_b$=16 bits per sample results in a bit rate of 19.2 MBits/s, which is very high for many practical applications like e.g. streaming. Thus, compression of HOA representations is highly desirable.

The compression of HOA sound field representations is proposed in WO 2013/171083 A1, EP 13305558.2 and PCT/EP2013/075559. These processings have in common that they perform a sound field analysis and decompose the given HOA representation into a directional component and a residual ambient component. On one hand the final compressed representation is assumed to consist of a number of quantised signals, resulting from the perceptual coding of the directional signals and relevant coefficient sequences of the ambient HOA component. On the other hand it is assumed to comprise additional side information related to the quantised signals, which side information is necessary for the reconstruction of the HOA representation from its compressed version.

An important part of that side information is a description of a prediction of portions of the original HOA representation from the directional signals. Since for this prediction the original HOA representation is assumed to be equivalently represented by a number of spatially dispersed general plane waves impinging from spatially uniformly distributed directions, the prediction is referred to as spatial prediction in the following.

The coding of such side information related to spatial prediction is described in ISO/IEC JTC1/SC29/WG11, N14061, "Working Draft Text of MPEG-H 3D Audio HOA RM0", November 2013, Geneva, Switzerland. However, this state-of-the-art coding of the side information is rather inefficient.

SUMMARY OF INVENTION

A problem to be solved by the invention is to provide a more efficient way of coding side information related to that spatial prediction.

A bit is prepended to the coded side information representation data $\zeta_{COD}$, which bit signals whether or not any prediction is to be performed. This feature reduces over time the average bit rate for the transmission of the $\zeta_{COD}$ data. Further, in specific situations, instead of using a bit array indicating for each direction if the prediction is performed or not, it is more efficient to transmit or transfer the number of active predictions and the respective indices. A single bit can be used for indicating in which way the indices of directions are coded for which a prediction is supposed to be performed. On average, this operation over time further reduces the bit rate for the transmission of the $\zeta_{COD}$ data.

In principle, the inventive method is suited for improving the coding of side information required for coding a Higher Order Ambisonics representation of a sound field, denoted HOA, with input time frames of HOA coefficient sequences, wherein dominant directional signals as well as a residual ambient HOA component are determined and a prediction is used for said dominant directional signals, thereby providing, for a coded frame of HOA coefficients, side information data describing said prediction, and wherein said side information data can include:

- a bit array indicating whether or not for a direction a prediction is performed;
- a bit array in which each bit indicates, for the directions where a prediction is to be performed, the kind of the prediction;
- a data array whose elements denote, for the predictions to be performed, indices of the directional signals to be used;
- a data array whose elements represent quantised scaling factors,
  - said method including the step:
  - providing a bit value indicating whether or not said prediction is to be performed;
  - if no prediction is to be performed, omitting said bit arrays and said data arrays in said side information data;
  - if said prediction is to be performed, providing a bit value indicating whether or not, instead of said bit array indicating whether or not for a direction a prediction is performed, a number of active predictions and a data array containing the indices of directions where a prediction is to be performed are included in said side information data.

In principle the inventive apparatus is suited for improving the coding of side information required for coding a Higher Order Ambisonics representation of a sound field, denoted HOA, with input time frames of HOA coefficient sequences, wherein dominant directional signals as well as a residual ambient HOA component are determined and a prediction is used for said dominant directional signals, thereby providing, for a coded frame of HOA coefficients, side information data describing said prediction, and wherein said side information data can include:

- a bit array indicating whether or not for a direction a prediction is performed;
- a bit array in which each bit indicates, for the directions where a prediction is to be performed, the kind of the prediction;
- a data array whose elements denote, for the predictions to be performed, indices of the directional signals to be used;
- a data array whose elements represent quantised scaling factors,
- said apparatus including means which:
  - provide a bit value indicating whether or not said prediction is to be performed;
  - if no prediction is to be performed, omit said bit arrays and said data arrays in said side information data;
  - if said prediction is to be performed, provide a bit value indicating whether or not, instead of said bit array indicating whether or not for a direction a prediction is performed, a number of active predictions and a data array containing the indices of directions where a prediction is to be performed are included in said side information data.

An aspect of the invention relates to a method for decoding a bitstream including encoded HOA representations. The method includes evaluating a value of a bit KindOfCodedPredIds; evaluating, based on the value of the bit KindOfCodedPredIds, a first array ActivePred, wherein each element of the first array ActivePred indicates if, for a corresponding direction, a prediction is performed; determining, based on the evaluation of the first array ActivePred, elements of a vector $p_{type}$; evaluating a second array PredDirSigIds, wherein elements of the second array PredDirSigIds denote indices of directional signals to be used for active predictions; determining, based on the vector $p_{type}$ and the elements of the second array PredDirSigIds, elements of a matrix AND denoting indices from which directional signals a prediction for a direction is to be performed. An aspect of the invention may further relate to apparatus and/or non-transitory computer readable medium code configured to perform this method.

Each element of the second array PredDirSigIds may denote, for the predictions to be performed, indices of the directional signals to be used and wherein each element was coded based on $\lceil \log_2(\tilde{D}_{ACT}+1|) \rceil$ bits, and is correspondingly decoded, wherein $\tilde{D}_{ACT}$ denotes a number of elements of said data set of indices of directional signals.

Advantageous additional embodiments of the invention are disclosed in the respective dependent claims.

BRIEF DESCRIPTION OF DRAWINGS

Exemplary embodiments of the invention are described with reference to the following accompanying drawings:

FIG. 5 illustrates a state of art coding of spatial prediction side information;

FIG. 6 illustrates an inventive coding of spatial prediction side information;

FIG. 7 illustrates inventive decoding of coded spatial prediction side information; and FIG. 8 is continuation of FIG. 7.

DESCRIPTION OF EMBODIMENTS

In the following, the HOA compression and decompression processing described in patent application EP 13305558.2 is recapitulated in order to provide the context in which the inventive coding of side information related to spatial prediction is used.

HOA Compression

Figure 1:
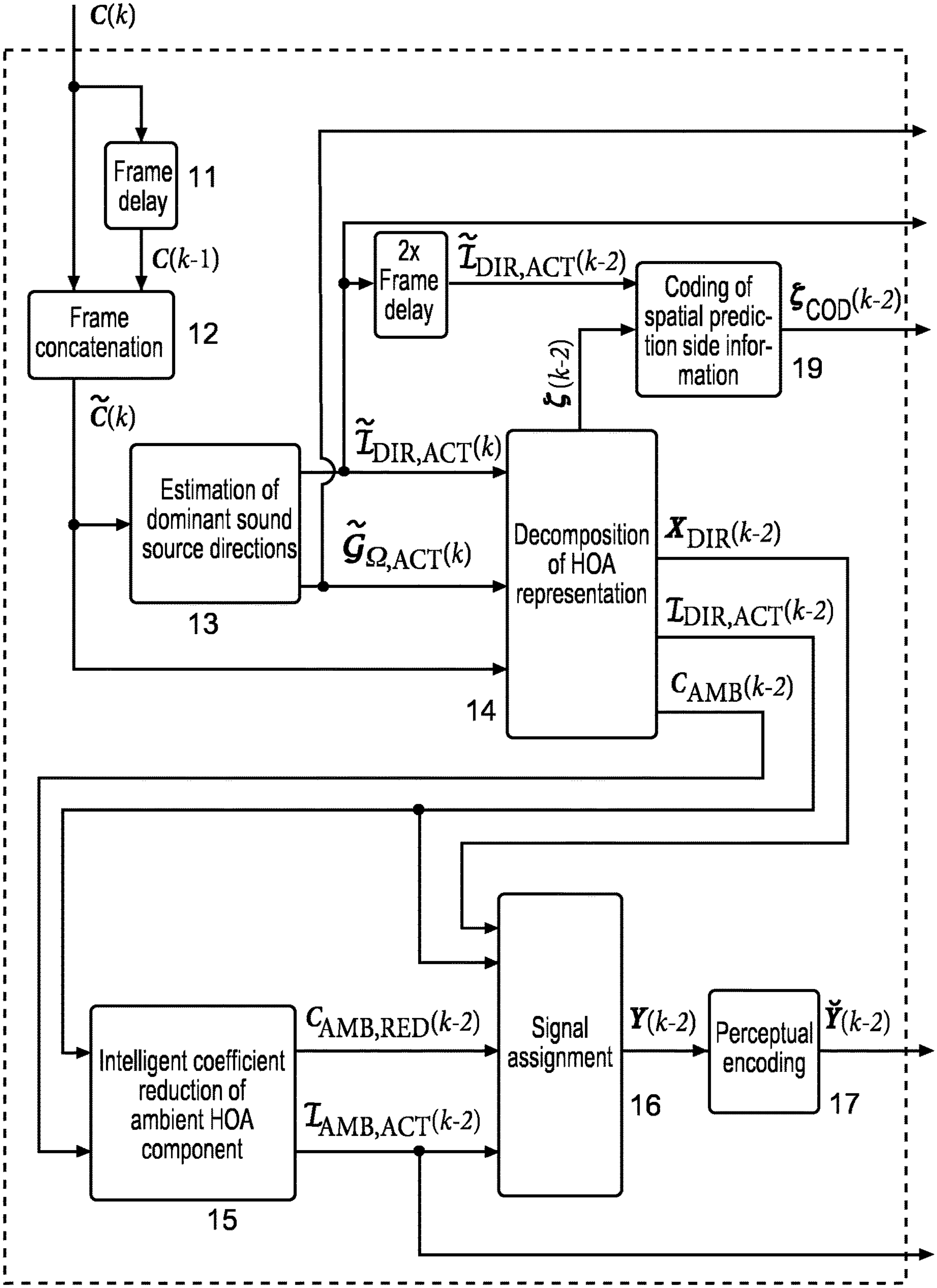
FIG. 1 illustrates an exemplary coding of side information related to spatial prediction in the HOA compression processing described in EP 13305558.2.

In FIG. 1 it is illustrated how the coding of side information related to spatial prediction can be embedded into the HOA compression processing described patent application EP 13305558.2.

For the HOA representation compression, a frame-wise processing with non-overlapping input frames C(k) of HOA coefficient sequences of length L is assumed, where k denotes the frame index. The first step or stage 11/12 in FIG. 1 is optional and consists of concatenating the non-overlapping k-th and (k−1)-th frames of HOA coefficient sequences C(k) into a long frame $\tilde{C}(k)$ as $$\tilde{C}(k):=[C(k-1)C(k)], \quad (1)$$

which long frame is 50% overlapped with an adjacent long frame and which long frame is successively used for the estimation of dominant sound source directions. Similar to the notation for $\tilde{C}(k)$, the tilde symbol is used in the following description for indicating that the respective quantity refers to long overlapping frames. If step/stage 11/12 is not present, the tilde symbol has no specific meaning.

A parameter in bold means a set of values, e.g. a matrix or a vector.

The long frame $\tilde{C}(k)$ is successively used in step or stage 13 for the estimation of dominant sound source directions as described in EP 13305558.2. This estimation provides a data set $\tilde{\mathcal{J}}_{DIR,ACT}(k) \subseteq \{1, \ldots, D\}$ of indices of the related directional signals that have been detected, as well as a data set $\tilde{\mathcal{G}}_{\Omega,ACT}(k)$ of the corresponding direction estimates of the directional signals. D denotes the maximum number of directional signals that has to be set before starting the HOA compression and that can be handled in the known processing which follows.

In step or stage 14, the current (long) frame $\tilde{C}(k)$ of HOA coefficient sequences is decomposed (as proposed in EP 13305156.5) into a number of directional signals $X_{DIR}(k-2)$ belonging to the directions contained in the set $\tilde{\mathcal{G}}_{\Omega,ACT}(k)$, and a residual ambient HOA component $C_{AMB}(k-2)$. The delay of two frames is introduced as a result of overlap-add processing in order to obtain smooth signals. It is assumed that $X_{DIR}(k-2)$ is containing a total of D channels, of which however only those corresponding to the active directional signals are non-zero. The indices specifying these channels are assumed to be output in the data set $\mathcal{J}_{DIR,ACT}(k-2)$. Additionally, the decomposition in step/stage 14 provides some parameters $\zeta(k-2)$ which can be used at decompression side for predicting portions of the original HOA representation from the directional signals (see EP 13305156.5 for more details). In order to explain the meaning of the spatial prediction parameters $\zeta(k-2)$, the HOA decomposition is described in more detail in the below section HOA decomposition.

In step or stage 15, the number of coefficients of the ambient HOA component $C_{AMB}(k-2)$ is reduced to contain only $O_{RED}$ $D-N_{DIR,ACT}(k-2)$ non-zero HOA coefficient sequences, where $N_{DIR,ACT}(k-^{2})-|\mathcal{J}_{DIR,ACT}(k-2)|$ indicates the cardinality of the data set $\mathcal{J}_{DIR,ACT}(k-2)$, i.e. the number of active directional signals in frame k−2. Since the ambient HOA component is assumed to be always represented by a minimum number $O_{RED}$ of HOA coefficient sequences, this problem can be actually reduced to the selection of the remaining $D-N_{DIR,ACT}(k-2)$ HOA coefficient sequences out of the possible $O-O_{RED}$ ones. In order to obtain a smooth reduced ambient HOA representation, this choice is accomplished such that, compared to the choice taken at the previous frame k−3, as few changes as possible will occur.

The final ambient HOA representation with the reduced number of $O_{RED}+N_{DIR,ACT}(k-2)$ non-zero coefficient sequences is denoted by $C_{AMB,RED}(k-2)$. The indices of the chosen ambient HOA coefficient sequences are output in the data set $\mathcal{J}_{AMB,ACT}(k-2)$.

In step/stage 16, the active directional signals contained in $X_{DIR}(k-2)$ and the HOA coefficient sequences contained in $C_{AMB,RED}(k-2)$ are assigned to the frame $Y(k-2)$ of l channels for individual perceptual encoding as described in EP 13305558.2.

Perceptual coding step/stage 17 encodes the I channels of frame $Y(k-2)$ and outputs an encoded frame $\breve{Y}(k-2)$.

According to the invention, following the decomposition of the original HOA representation in step/stage 14, the spatial prediction parameters or side information data $\zeta(k-2)$ resulting from the decomposition of the HOA representation are losslessly coded in step or stage 19 in order to provide a coded data representation $\zeta_{COD}(k-2)$, using the index set $\tilde{\mathcal{J}}_{DIR,ACT}(k)$ delayed by two frames in delay 18.

HOA Decompression

Figure 2:
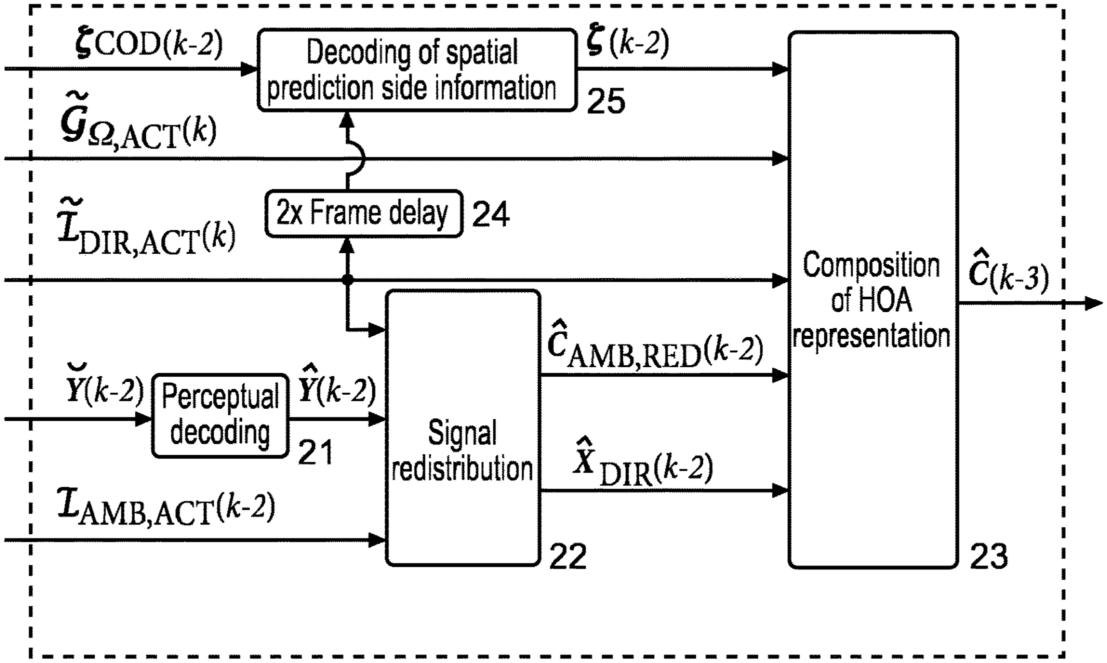
FIG. 2 illustrates an exemplary decoding of side information related to spatial prediction in the HOA decompression processing described in patent application EP 13305558.2.
Figure 3:
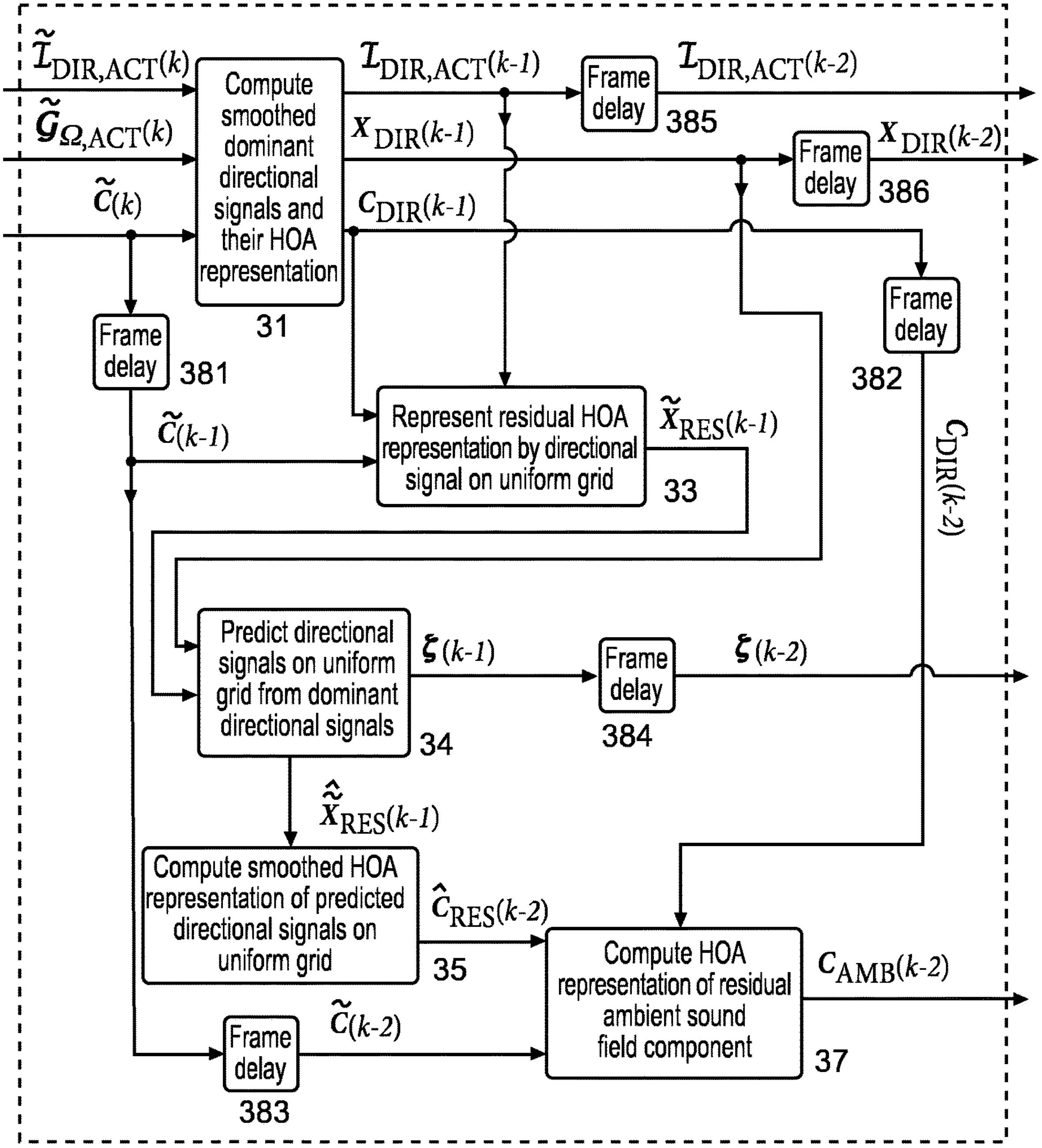
FIG. 3 illustrates an HOA decomposition as described in patent application PCT/EP2013/075559.

In FIG. 2 it is exemplary shown how to embed in step or stage 25 the decoding of the received encoded side information data $\zeta_{COD}(k-2)$ related to spatial prediction into the HOA decompression processing described in FIG. 3 of patent application EP 13305558.2. The decoding of the encoded side information data $\zeta_{COD}(k-2)$ is carried out before entering its decoded version $1(k-2)$ into the composition of the HOA representation in step or stage 23, using the received index set $\tilde{\mathcal{J}}_{DIR,ACT}(k)$ delayed by two frames in delay 24.

In step or stage 21 a perceptual decoding of the I signals contained in $\breve{Y}(k-2)$ is performed in order to obtain the I decoded signals in $\hat{Y}(k-2)$.

In signal re-distributing step or stage 22, the perceptually decoded signals in $\hat{Y}(k-2)$ are re-distributed in order to recreate the frame $\hat{X}_{DIR}(k-2)$ of directional signals and the frame $\hat{C}_{AMB,RED}(k-2)$ of the ambient HOA component. The information about how to re-distribute the signals is obtained by reproducing the assigning operation performed for the HOA compression, using the index data sets $\tilde{\mathcal{J}}_{DIR,ACT}(k)$ and $\mathcal{J}_{AMB,ACT}(k-2)$.

Figure 4:
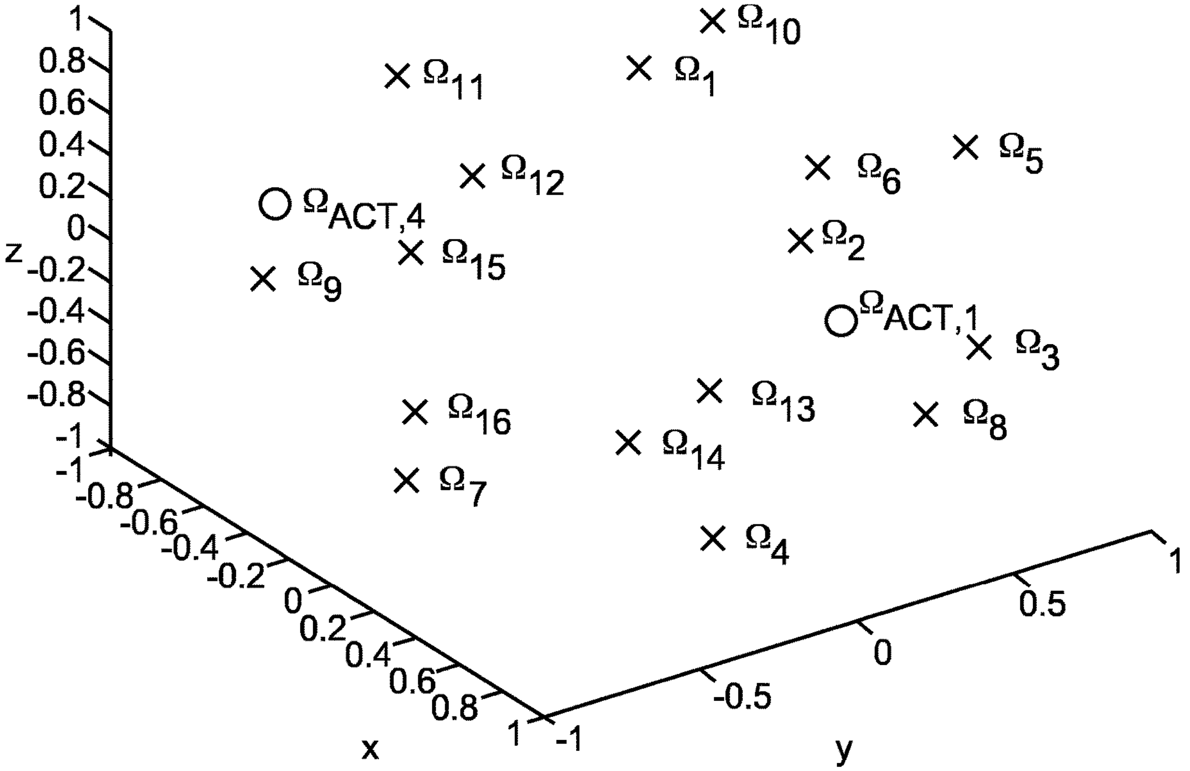
FIG. 4 depicts an illustration of directions (depicted as crosses) of general plane waves representing the residual signal and the directions (depicted as circles) of dominant sound sources. The directions are presented in a three-dimensional coordinate system as sampling positions on the unit sphere.

In composition step or stage 23, a current frame $\hat{C}(k-3)$ of the desired total HOA representation is re-composed (according to the processing described in connection with FIG. 2*b* and FIG. 4 of PCT/EP2013/075559 using the frame $\hat{X}_{DIR}(k-2)$ of the directional signals, the set $\tilde{\mathcal{J}}_{DIR,ACT}(k)$ of the active directional signal indices together with the set $\tilde{G}_{\Omega,ACT}(k)$ of the corresponding directions, the parameters $\zeta(k-2)$ for predicting portions of the HOA representation from the directional signals, and the frame $\hat{C}_{AMB,RED}(k-2)$ of HOA coefficient sequences of the reduced ambient HOA component.

$\hat{C}_{AMB,RED}(k-2)$ corresponds to component $D_A(k-2)$ in PCT/EP2013/075559, and $\tilde{G}_{\Omega,ACT}(k)$ and $\tilde{\mathcal{J}}_{DIR,ACT}(k)$ correspond to $A_{\hat{\Omega}}(k)$ in PCT/EP2013/075559, wherein active directional signal indices can be obtained by taking those indices of rows of $A_{\hat{\Omega}}(k)$ which contain valid elements. I.e., directional signals with respect to uniformly distributed directions are predicted from the directional signals $\hat{X}_{DIR}(k-2)$ using the received parameters $\zeta(k-2)$ for such prediction, and thereafter the current decompressed frame $\hat{C}(k-3)$ is re-composed from the frame of directional signals $\hat{X}_{DIR}(k-2)$, from $\mathcal{J}_{DIR,ACT}(k)$ and $\tilde{G}_{\Omega,ACT}(k)$, and from the predicted portions and the reduced ambient HOA component $\hat{C}_{AMB,RED}(k-2)$.

HOA Decomposition

In connection with FIG. 3 the HOA decomposition processing is described in detail in order to explain the meaning of the spatial prediction therein. This processing is derived from the processing described in connection with FIG. 3 of patent application PCT/EP2013/075559.

First, the smoothed dominant directional signals $X_{DIR}(k-1)$ and their HOA representation $C_{DIR}(k-1)$ are computed in step or stage 31, using the long frame $\tilde{C}(k)$ of the input HOA representation, the set $\tilde{G}_{\Omega,ACT}(k)$ of directions and the set $\tilde{\mathcal{J}}_{DIR,ACT}(k)$ of corresponding indices of directional signals.

It is assumed that $X_{DIR}(k-1)$ contains a total of D channels, of which however only those corresponding to the active directional signals are non-zero. The indices specifying these channels are assumed to be output in the set $\mathcal{J}_{DIR,ACT}(k-1)$.

In step or stage 33 the residual between the original HOA representation $\tilde{C}(k-1)$ and the HOA representation $C_{DIR}(k-1)$ of the dominant directional signals is represented by a number of O directional signals $\tilde{X}_{RES}(k-1)$, which can be considered as being general plane waves from uniformly distributed directions, which are referred to a uniform grid.

In step or stage 34 these directional signals are predicted from the dominant directional signals $X_{DIR}(k-1)$ in order to provide the predicted signals $\hat{\tilde{X}}_{RES}(k-1)$ together with the respective prediction parameters $\zeta(k-1)$. For the prediction only the dominant directional signals $x_{DIR,d}(k-1)$ with indices d, which are contained in the set $\mathcal{J}_{DIR,ACT}(k-1)$, are considered. The prediction is described in more detail in the below section Spatial prediction.

In step or stage 35 the smoothed HOA representation $\hat{C}_{RES}(k-2)$ of the predicted directional signals $\hat{\tilde{X}}_{RES}(k-1)$ is computed.

In step or stage 37 the residual $C_{AMB}(k-2)$ between the original HOA representation $\tilde{C}(k-2)$ and the HOA representation $C_{DIR}(k-2)$ of the dominant directional signals together with the HOA representation $\hat{C}_{RES}(k-2)$ of the predicted directional signals from uniformly distributed directions is computed and is output.

The required signal delays in the FIG. 3 processing are performed by corresponding delays 381 to 387.

Spatial Prediction

The goal of the spatial prediction is to predict the O residual signals $$\tilde{X}_{RES}(k-1) = \begin{bmatrix} \tilde{x}_{RES,GRID,1}(k-1) \\ \tilde{x}_{RES,GRID,2}(k-1) \\ \vdots \\ \tilde{x}_{RES,GRID,O}(k-1) \end{bmatrix} \quad (2)$$

from the extended frame $$\tilde{X}_{DIR}(k-1) := [X_{DIR}(k-3)\ X_{DIR}(k-2)\ X_{DIR}(k-1)] \quad (3)$$

$$= \begin{bmatrix} \tilde{x}_{DIR,1}(k-1) \\ \tilde{x}_{DIR,2}(k-1) \\ \vdots \\ \tilde{x}_{DIR,D}(k-1) \end{bmatrix} \quad (4)$$

of smoothed directional signals (see the description in above section HOA decomposition and in patent application PCT/EP2013/075559).

Each residual signal $\tilde{x}_{RES,GRID,q}(k-1)$, q=1, . . . , O, represents a spatially dispersed general plane wave impinging from the direction $\Omega_q$, whereby it is assumed that all the directions $\Omega_q$, q=1, . . . , O are nearly uniformly distributed over the unit sphere. The total of all directions is referred to as a 'grid'.

Each directional signal $\tilde{x}_{DIR,d}(k-1)$, d=1, . . . , D represents a general plane wave impinging from a trajectory interpolated between the directions $\Omega_{ACT,d}(k-3)$, $\Omega_{ACT,d}(k-2)$, $\Omega_{ACT,d}(k-1)$ and $\Omega_{ACT,d}(k)$, assuming that the d-th directional signal is active for the respective frames.

To illustrate the meaning of the spatial prediction by means of an example, the decomposition of an HOA representation of order N=3 is considered, where the maximum number of directions to extract is equal to D=4. For simplicity it is further assumed that only the directional signals with indices '1' and '4' are active, while those with indices '2' and '3' are non-active. Additionally, for simplicity it is assumed that the directions of the dominant sound sources are constant for the considered frames, i.e.

$$\Omega_{ACT,d}(k-3)=\Omega_{ACT,d}(k-2)=\Omega_{ACT,d}(k-1)=\Omega_{ACT,d}(k) =\Omega_{ACT,d} \text{ for } d=1,4 \quad (5)$$

As a consequence of order N=3, there are 0=16 directions $\Omega_q$ of spatially dispersed general plane waves $\tilde{x}_{RES,GRID,q}(k-1)$ q=1, . . . , O. FIG. 4 shows these directions together with the directions $\Omega_{ACT,1}$ and $\Omega_{ACT,4}$ of the active dominant sound sources.

State-of-the-Art Parameters for Describing the Spatial Prediction

One way of describing the spatial prediction is presented in the above-mentioned ISO/IEC document. In this document, the signals $\tilde{x}_{RES,GRID,q}(k-1)$, q=1, . . . , O are assumed to be predicted by a weighted sum of a predefined maximum number $D_{PRED}$ of directional signals, or by a low pass filtered version of the weighted sum. The side information related to spatial prediction is described by the parameter set $\zeta(k-1)=\{p_{TYPE}(k-1), P_{IND}(k-1), P_{Q,F}(k-1)\}$, which consists of the following three components:

- The vector $p_{TYPE}(k-1)$ whose elements $p_{TYPE,q}(k-1)$, q=1, . . . , O indicate whether or not for the q-th direction $\Omega_7$ a prediction is performed, and if so, then they also indicate which kind of prediction. The meaning of the elements is as follows:

$$p_{TYPE,q}(k-1) = \begin{cases} 0 & \text{for no prediction for direction } \Omega_q \\ 1 & \text{for a full band prediction for direction } \Omega_q \\ 2 & \text{for a low band prediction for direction } \Omega_q \end{cases}. \quad (6)$$

- The matrix $P_{IND}(k-1)$, whose elements $p_{IND,d,q}(k-1)$, d=1, . . . $D_{PRED}$, q=1, . . . , O denote the indices from which directional signals the prediction for the direction $\Omega_q$ has to be performed. If no prediction is to be performed for a direction $\Omega_q$, the corresponding column of the matrix $P_{IND}(k-1)$ consists of zeros. Further, if less than $D_{PRED}$ directional signals are used for the prediction for a direction $\Omega_q$, the non-required elements in the q-th column of $P_{IND}(k-1)$ are also zero.
- The matrix $P_{Q,F}(k-1)$, which contains the corresponding quantised prediction factors $p_{Q,F,d,q}(k-1)$, d=1, . . . , $D_{PRED}$, q=1, . . . , O.

The following two parameters have to be known at decoding side for enabling the appropriate interpretation of these parameters:

- The maximum number $D_{PRED}$ of directional signals, from which a general plane wave signal $\tilde{x}_{RES,GRID,q}(k-1)$ is allowed to be predicted.
- The number $B_{SC}$ of bits used for quantising the prediction factors $p_{Q,F,d,q}(k-1)$, d=1, . . . , $D_{PRED}$, q=1, . . . , O. The de-quantisation rule is given in equation (10).

These two parameters have to either be set to fixed values known to the encoder and decoder, or to be additionally transmitted, but distinctly less frequently than the frame rate. The latter option may be used for adapting the two parameters to the HOA representation to be compressed.

An example for a parameter set may look like the following, assuming O=16, $D_{PRED}$=2 and $B_{SC}$=8:

$$p_{TYPE}(k-1) = [1\ 0\ 0\ 0\ 0\ 0\ 2\ 0\ 0\ 0\ 0\ 0\ 0\ 0\ 0\ 0], \quad (7)$$

$$P_{IND}(k-1) = \begin{bmatrix} 1 & 0 & 0 & 0 & 0 & 0 & 1 & 0 & 0 & 0 & 0 & 0 & 0 & 0 & 0 & 0 \\ 0 & 0 & 0 & 0 & 0 & 0 & 4 & 0 & 0 & 0 & 0 & 0 & 0 & 0 & 0 & 0 \end{bmatrix}, \quad (8)$$

$$P_{Q,F}(k-1) = \begin{bmatrix} 40 & 0 & 0 & 0 & 0 & 0 & 15 & 0 & 0 & 0 & 0 & 0 & 0 & 0 & 0 & 0 \\ 0 & 0 & 0 & 0 & 0 & 0 & -13 & 0 & 0 & 0 & 0 & 0 & 0 & 0 & 0 & 0 \end{bmatrix}. \quad (9)$$

Such parameters would mean that the general plane wave signal $\tilde{x}_{RES,GRID,1}(k-1)$ from direction $\Omega_1$ is predicted from the directional signal $\tilde{x}_{DIR,1}(k-1)$ from direction $\Omega_{ACT,1}$ by a pure multiplication (i.e. full band) with a factor that results from de-quantising the value 40. Further, the general plane wave signal $\tilde{x}_{RES,GRID,7}(k-1)$ from direction $\Omega_7$ is predicted from the directional signals $\tilde{x}_{Dm\,j}(k-1)$ and $\tilde{x}_{DIR,4}(k-1)$ by a lowpass filtering and multiplication with factors that result from de-quantising the values 15 and −13.

and the directional signals $$\tilde{X}_{DIR}(k-1) = \begin{bmatrix} \tilde{x}_{DIR,1}(k-1) \\ \tilde{x}_{DIR,2}(k-1) \\ \vdots \\ \tilde{x}_{DIR,D}(k-1) \end{bmatrix} \quad (14)$$

to be composed of their samples by $$\hat{\tilde{x}}_{RES,q}(k-1) = [\hat{\tilde{x}}_{RES,q}(k-1,1)\hat{\tilde{x}}_{RES,q}(k-1,2) \ldots \hat{\tilde{x}}_{RES,q}(k-1,2L)] \text{ for } q=1, \ldots, O, \quad (15)$$

and $$\hat{\tilde{x}}_{DIR,d}(k-1) = [\hat{\tilde{x}}_{DIR,d}(k-1,1)\hat{\tilde{x}}_{DIR,d}(k-1,2) \ldots \hat{\tilde{x}}_{DIR,d}(k-1,2L)] \text{ for } q=1, \ldots, O, \quad (16)$$

the sample values of the predicted signals are given by $$\hat{\tilde{x}}_{RES,q}(k-1, l) = \begin{cases} 0 & \text{if } p_{TYPE,q}(k-1) = 0 \\ \sum_{d=1}^{D_{PRED}} p_{F,d,q}(k-1) \cdot \tilde{x}_{DIR,p_{IND,d,q}(k-1)}(k-1, L+l) & \text{if } p_{TYPE,q}(k-1) = 1 \\ \sum_{d=1}^{D_{PRED}} p_{F,d,q}(k-1) \cdot \tilde{y}_{LP,q}(k-1, l) & \text{if } p_{TYPE,q}(k-1) = 2 \end{cases} \quad (17)$$

Given this side information, the prediction is assumed to be performed as follows:

First, the quantised prediction factors $p_{Q,F,d,q}(k-1)$, $d=1, \ldots, D_{PRED}$, $q=1, \ldots, O$ are dequantised to provide the actual prediction factors $$p_{F,d,q}(k-1) = \begin{cases} \left(p_{Q,F,d,q}(k-1) + \frac{1}{2}\right) 2^{-B_{SC}+1} & \text{if } p_{IND,d,q}(k-1) \neq 0 \\ 0 & \text{if } p_{IND,d,q}(k-1) = 0 \end{cases}. \quad (10)$$

As already mentioned, $B_{SC}$ denotes a predefined number of bits to be used for the quantisation of the prediction factors. Additionally, $p_{Q,F,d,q}(k-1)$ is assumed to be set to zero, if $p_{IND,d,q}(k-1)$ is equal to zero.

For the previously mentioned example, assuming $B_{SC}=8$, the de-quantised prediction factor vector would result in $$P_F(k-1) \approx \begin{bmatrix} 0.3164 & 0 & 0 & 0 & 0 & 0 & 0.1211 & 0 & 0 & 0 & 0 & 0 & 0 & 0 & 0 & 0 \\ 0 & 0 & 0 & 0 & 0 & 0 & -0.0977 & 0 & 0 & 0 & 0 & 0 & 0 & 0 & 0 & 0 \end{bmatrix}. \quad (11)$$

Further, for performing a low pass prediction a predefined low pass FIR filter $$h_{LP} := [h_{LP}(0)h_{LP}(1) \ldots h_{LP}(L_h-1)] \quad (12)$$

of length $L_h=31$ is used. The filter delay is given by $D_h=15$ samples.

Assuming as signals the predicted signals $$\hat{\tilde{X}}_{RES}(k-1) = \begin{bmatrix} \hat{\tilde{x}}_{RES,1}(k-1) \\ \hat{\tilde{x}}_{RES,2}(k-1) \\ \vdots \\ \hat{\tilde{x}}_{RES,O}(k-1) \end{bmatrix} \quad (13)$$

with $$\tilde{y}_{LP,q}(k-1,l) := \sum_{j=0}^{\min(L_h-1,\, l+2D_h-1)} h_{LP}(j) \cdot x_{DIR,p_{IND,d,q}(k-1)}(k-1, L+l+D_h-j). \quad (18)$$

As already mentioned and as now can be seen from equation (17), the signals $\tilde{x}_{RES,GRID,q}(k-1)$, $q=1, \ldots, O$ are assumed to be predicted by a weighted sum of a predefined maximum number $D_{PRED}$ of directional signals, or by a low pass filtered versions of the weighted sum.

State-of-the-Art Coding of the Side Information Related to Spatial Prediction

In the above-mentioned ISO/IEC document the coding of the spatial prediction side information is addressed. It is summarised in Algorithm 1 depicted in FIG. 5 and will be explained in the following. For a clearer presentation the frame index k−1 is neglected in all expressions.

First, a bit array ActivePred consisting of O bits is created, in which the bit ActivePred[q] indicates whether or not for the direction $\Omega_q$ a prediction is performed. The number of 'ones' in this array is denoted by NumActivePred.

Next, the bit array PredType of length NumActivePred is created where each bit indicates, for the directions where a prediction is to be performed, the kind of the prediction, i.e. full band or low pass. At the same time, the unsigned integer array PredDirSigIds of length NumActivePred $D_{PRED}$ is created, whose elements denote for each active prediction the $D_{PRED}$ indices of the directional signals to be used. If less than $D_{PRED}$ directional signals are to be used for the prediction, the indices are assumed to be set to zero. Each element of the array PredDirSigIds is assumed to be represented by $\lceil \log_2(D+1) \rceil$ bits. The number of non-zero elements in the array PredDirSigIds is denoted by NumNonZeroIds.

Finally, the integer array QuantPredGains of length NumNonZeroIds is created, whose elements are assumed to represent the quantised scaling factors $P_{Q,F,d,q}(k-1)$ to be used in equation (17). The dequantisation to obtain the corresponding dequantised scaling factors $P_{F,d,q}(k-1)$ is given in equation (10). Each element of the array QuantPredGains is assumed to be represented by $B_{SC}$ bits.

In the end, the coded representation of the side information $\zeta_{COD}$ consists of the four aforementioned arrays according to $$\zeta_{COD}=[\text{ActivePred PredType PredDirSigIds QuantPredGains}]. \quad (19)$$

For explaining this coding by an example, the coded representation of equations (7) to (9) is used:

$$\text{ActivePred}=[1\ 0\ 0\ 0\ 0\ 0\ 1\ 0\ 0\ 0\ 0\ 0\ 0\ 0\ 0\ 0] \quad (20)$$

$$\text{PredType}=[0\ 1] \quad (21)$$

$$\text{PredDirSigIds}=[1\ 0\ 1\ 4] \quad (22)$$

$$\text{QuantPredGains}=[40\ 15\ -13]. \quad (23)$$

The number of required bits is equal to 16+2+3·4+8·3=54.

Inventive Coding of the Side Information Related to Spatial Prediction

In order to increase the efficiency of the coding of the side information related to spatial prediction, the state-of-the-art processing is advantageously modified.

A) When coding HOA representations of typical sound scenes, the inventors have observed that there are often frames where in the HOA compression processing the decision is taken to not perform any spatial prediction at all. However, in such frames the bit array ActivePred consists of zeros only, the number of which is equal to O. Since such frame content occurs quite often, the inventive processing prepends to the coded representation $\zeta_{COD}$ a single bit PSPredictionActive, which indicates if any prediction is to be performed or not. If the value of the bit PSPredictionActive is zero (or '1' as an alternative), the array ActivePred and further data related to the prediction are not to be included into the coded side information $\zeta_{COD}$. In practise, this operation reduces over time the average bit rate for the transmission of $\zeta_{COD}$).

B) A further observation made while coding HOA representations of typical sound scenes is that the number NumActivePred of active prediction is often very low. In such situation, instead of using the bit array ActivePred for indicating for each direction $\Omega_q$ whether or not the prediction is performed, it can be more efficient to transmit or transfer instead the number of active predictions and the respective indices. In particular, this modified kind of coding the activity is more efficient in case that $$\text{NumActivePred} \le M_M, \quad (24)$$

where $M_M$ is the greatest integer number that satisfies $$\lceil \log_2(M_M) \rceil + M_M \cdot \lceil \log_2(O) \rceil < O. \quad (25)$$

The value of $M_M$ can be computed only with the knowledge of the HOA order N: $O=(N+1)^2$ as mentioned above.

In equation (25), $\lceil \log_2(M_M) \rceil$ denotes the number of bits required for coding the actual number NumActivePred of active predictions, and $M_M \cdot \lceil \log_2(O) \rceil$ is the number of bits required for coding the respective direction indices. The right hand side of equation (25) corresponds to the number of bits of the array ActivePred, which would be required for coding the same information in the known way.

According to the aforementioned explanations, a single bit KindOfCodedPredIds can be used for indicating in which way the indices of those directions, where a prediction is supposed to be performed, are coded. If the bit KindOfCodedPredIds has the value '1' (or '0' in the alternative), the number NumActivePred and the array PredIds containing the indices of directions, where a prediction is supposed to be performed, are added to the coded side information $\zeta_{COD}$. Otherwise, if the bit KindOfCodedPredIds has the value '0' (or '1' in the alternative), the array ActivePred is used to code the same information.

On average, this operation reduces over time the bit rate for the transmission of $\zeta_{COD}$.

C) To further increase the side information coding efficiency, the fact is exploited that often the actually available number of active directional signals to be used for prediction is less than D. This means that for the coding of each element of the index array PredDirSigIds less than $\lceil \log_2(D+1) \rceil$ bits are required. In particular, the actually available number of active directional signals to be used for prediction is given by the number $\tilde{D}_{ACT}$, of elements of the data set $\tilde{\mathcal{J}}_{DIR,ACT}$, which contains the indices $\tilde{\iota}_{ACT,1}, \ldots, \tilde{\iota}_{ACT,\tilde{D}_{ACT}}$ of the active directional signals. Hence, $\lceil \log_2(|\tilde{D}_{ACT}+1|) \rceil$ bits can be used for coding each element of the index array PredDirSigIds, which kind of coding is more efficient. In the decoder the data set $\tilde{\mathcal{J}}_{DIR,ACT}$ is assumed to be known, and thus the decoder also knows how many bits have to be read for decoding an index of a directional signal. Note that the frame indices of $\zeta_{COD}$ to be computed and the used index data set $\tilde{\mathcal{J}}_{DIR,ACT}$ have to be identical.

The above modifications A) to C) for the known side information coding processing result in the example coding processing depicted in FIG. 6.

Consequently, the coded side information consists of the following components:

(26)

$\zeta_{COD} =$

-continued $$\begin{cases} [PSPredictionActive] & \text{if } PSPredictionActive = 0 \\ \begin{bmatrix} PSPredictionActive \\ KindOfCodedPredIds \\ ActivePred \\ PredType \\ PredDirSigIds \\ QuantPredGains \end{bmatrix} & \text{if } PSPredictionActive = 1 \wedge KindOfCodedPredIds = 0 \\ \begin{bmatrix} PSPredictionActive \\ KindOfCodedPredIds \\ NumActivePred \\ PredIds \\ PredType \\ PredDirSigIds \\ QuantPredGains \end{bmatrix} & \text{if } PSPredictionActive = 1 \wedge KindOfCodedPredIds = 1 \end{cases}$$

Remark: in the above-mentioned ISO/IEC document e.g. in section 6.1.3, QuantPredGains is called PredGains, which however contains quantised values.

The coded representation for the example in equations (7) to (9) would be:

$$\text{PSPredictionActive}=1 \quad (27)$$

$$\text{KindOfCodedPredIds}=1 \quad (28)$$

$$\text{NumActivePred}=2 \quad (29)$$

$$\text{PredIds}=[1\ 7] \quad (30)$$

$$\text{PredType}=[0\ 1] \quad (31)$$

$$\text{PredDirSigIds}=[1\ 0\ 1\ 4] \quad (32)$$

$$\text{QuantPredGains}=[40\ 15\ -13], \quad (33)$$

and the required number of bits is 1+1+2+2 4+2+2 4+8 3=46. Advantageously, compared to the state of the art coded representation in equations (20) to (23), this representation coded according to the invention requires 8 bits less.

Decoding of the Modified Side Information Coding Related to Spatial Prediction

The decoding of the modified side information related to spatial prediction is summarised in the example decoding processing depicted in FIG. 7 and FIG. 8 (the processing depicted in FIG. 8 is the continuation of the processing depicted in FIG. 7) and is explained in the following.

Initially, all elements of vector $p_{TYPE}$ and matrices $R_{IND}$ and $P_{Q,F}$ are initialised by zero. Then the bit PSPredictionActive is read, which indicates if a spatial prediction is to be performed at all. In the case of a spatial prediction (i.e. PSPredictionActive=1), the bit KindOfCodedPredIds is read, which indicates the kind of coding of the indices of directions for which a prediction is to be performed.

In the case that KindOfCodedPredIds=0, the bit array ActivePred of length O is read, of which the q-th element indicates if for the direction $\Omega_q$ a prediction is performed or not. In a next step, from the array ActivePred the number NumActivePred of predictions is computed and the bit array PredType of length NumActivePred is read, of which the elements indicate the kind of prediction to be performed for each of the relevant directions. With the information contained in ActivePred and PredType, the elements of the vector $P_{TYPE}$ are computed.

In case KindOfCodedPredIds=1, the number NumActivePred of active predictions is read, which is assumed to be coded with $\lceil \log_2(M_M) \rceil$ bits, where $M_M$ is the greatest integer number satisfying equation (25). Then, the data array PredIds consisting of NumActivePred elements is read, where each element is assumed to be coded by $\lceil \log_2(O) \rceil$ bits. The elements of this array are the indices of directions, where a prediction has to be performed. Successively, the bit array PredType of length NumActivePred is read, of which the elements indicate the kind of prediction to be performed for each one of the relevant directions. With the knowledge of NumActivePred, PredIds and PredType, the elements of the vector $p_{TYPE}$ are computed.

For both cases (i.e. KindOfCodedPredIds=0 and KindOfCodedPredIds=1), in the next step the array PredDirSigIds is read, which consists of NumActivePred $D_{PRED}$ elements. Each element is assumed to be coded by $\lceil \log_2(\tilde{D}_{ACT}) \rceil$ bits. Using the information contained in $p_{TYPE}$, $\tilde{\mathcal{J}}_{DIR,ACT}$ and PredDirSigIds, the elements of matrix $R_{IND}$ are set and the number NumNonZeroIds of non-zero elements in $P_{IND}$ is computed.

Finally, the array QuantPredGains is read, which consists of NumNonZeroIds elements, each coded by $B_{SC}$ bits. Using the information contained in $R_{IND}$ and QuantPredGains, the elements of the matrix $P_{Q,F}$ are set.

The inventive processing can be carried out by a single processor or electronic circuit, or by several processors or electronic circuits operating in parallel and/or operating on different parts of the inventive processing.

What is claimed is:

1. A method for decoding a bitstream comprising encoded Higher Order Ambisonics (HOA) representations, said method comprising:

reading a bit KindOfCodedPredIds;

determining, based on a determination that KindOfCodedPredIds=0: an array ActivePred, wherein each element of the first array ActivePred indicates if, for a corresponding direction, a prediction is performed;

determining a vector $p_{type}$, wherein the vector $p_{type}$ is determined based on the array ActivePred; and determining, based on the vector $p_{type}$, a matrix $P_{IND}$ denoting indices from which directional signals a prediction for a direction is to be performed.

2. A non-transitory storage medium that contains or stores, or has recorded on it, a digital audio signal according to claim 1.

3. A non-transitory computer readable medium storing a computer program that, when executed by a processor, execute the method of claim 1.

4. An apparatus for decoding a bitstream including encoded Higher Order Ambisonics (HOA) representations, the apparatus comprising:

a first processor for reading a bit KindOfCodedPredIds;

a second processor configured to:

determine, based on a determination that KindOfCodedPredIds=0: an array ActivePred, wherein each element of the array ActivePred indicates if, for a corresponding direction, a prediction is performed; and determine a vector $p_{type}$, wherein the vector $p_{type}$ is determined based on the array ActivePred;

and a third processor for determining, based on the vector $p_{type}$, a matrix $P_{IND}$ denoting indices from which directional signals a prediction for a direction is to be performed.

* * * * *